United States Patent [19]

Sevault et al.

[11] Patent Number: 5,239,888
[45] Date of Patent: Aug. 31, 1993

[54] STEERING-COLUMN BODY TUBE FOR A MOTOR VEHICLE

[75] Inventors: Bernard Sevault; Jean R-René Blais, both of Vendome, France

[73] Assignee: NACAM, Vendome, France

[21] Appl. No.: 844,191

[22] Filed: Mar. 2, 1992

[30] Foreign Application Priority Data

Mar. 4, 1991 [FR] France ................. 91 02559

[51] Int. Cl.$^5$ .............................. B62D 1/16
[52] U.S. Cl. ...................... 74/492; 280/779; 72/368
[58] Field of Search .............. 72/363, 367, 368; 29/521; 74/492; 280/779; 138/166; 228/128, 129, 144

[56] References Cited

U.S. PATENT DOCUMENTS

| 1,991,988 | 2/1935 | Spatta | 228/144 |
|---|---|---|---|
| 1,999,818 | 4/1935 | McIntyre | 228/144 |
| 2,202,909 | 6/1940 | Hufferd et al. | 74/579 R |
| 2,675,774 | 4/1954 | Bergan | 72/368 X |
| 3,273,601 | 9/1966 | De Gain | 138/166 |
| 3,394,612 | 7/1968 | Bogosoff et al. | 74/492 |
| 3,475,984 | 11/1969 | Ward | 74/492 |
| 3,577,621 | 5/1971 | De Gain | 74/492 X |
| 3,835,725 | 9/1974 | Furusho | 74/492 |
| 3,864,988 | 2/1975 | Adams, III | 74/492 |
| 4,490,422 | 12/1984 | Pascher | 138/166 X |
| 4,628,720 | 12/1986 | Tani et al. | 72/368 |
| 5,088,768 | 2/1992 | Maruyama et al. | 74/492 X |

FOREIGN PATENT DOCUMENTS 2905130 8/1980 Fed. Rep. of Germany .

Primary Examiner—Leslie A. Braun
Assistant Examiner—Khoi Q. Ta
Attorney, Agent, or Firm—Burns, Doane, Swecker & Mathis

[57] ABSTRACT

A steering-column body tube for a motor vehicle is provided from a blank cut-out of a single metal sheet with which is formed two front fixing lugs, two rear fixing lugs, and a tube. The elements of the blank cut-out are rolled over in such a manner as to bring the edges of the tube together to form a tube possessing a front opening and a rear opening at the location of the front and rear fixing lugs. The fixing lugs, together with the tube, are a single part made as one piece. A linkage arm connects a front element of the tube with a rear element of the tube.

20 Claims, 2 Drawing Sheets

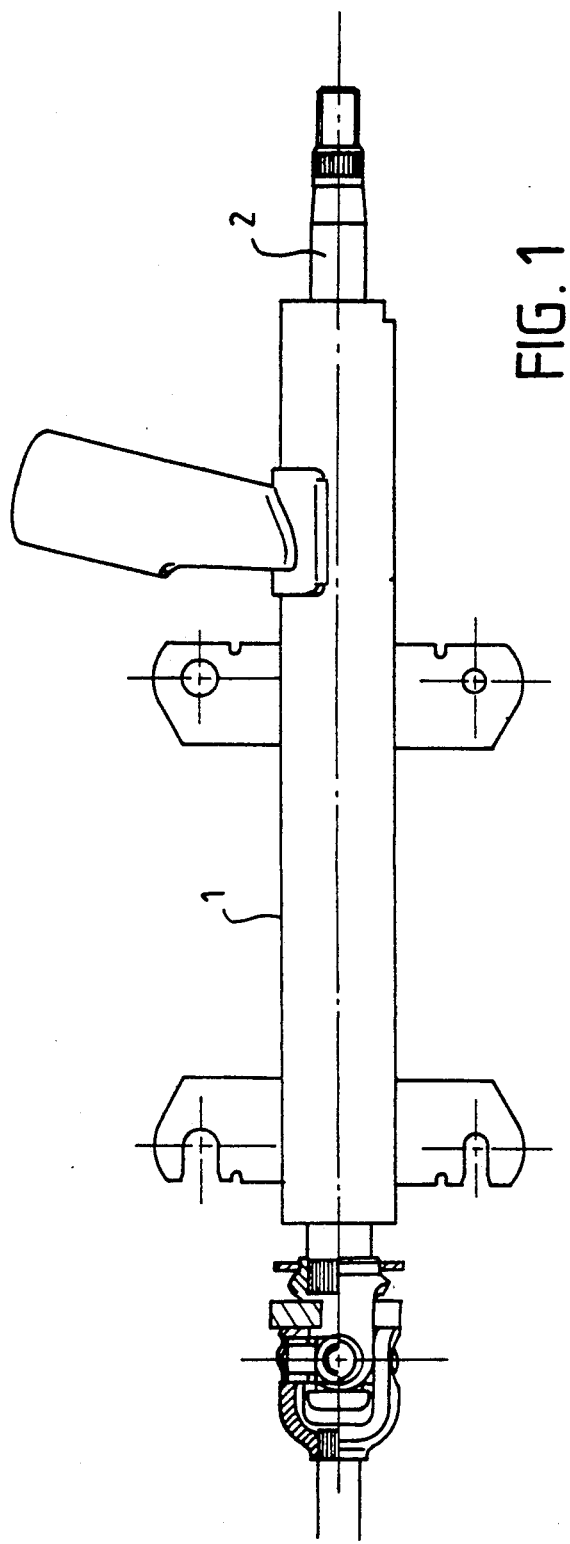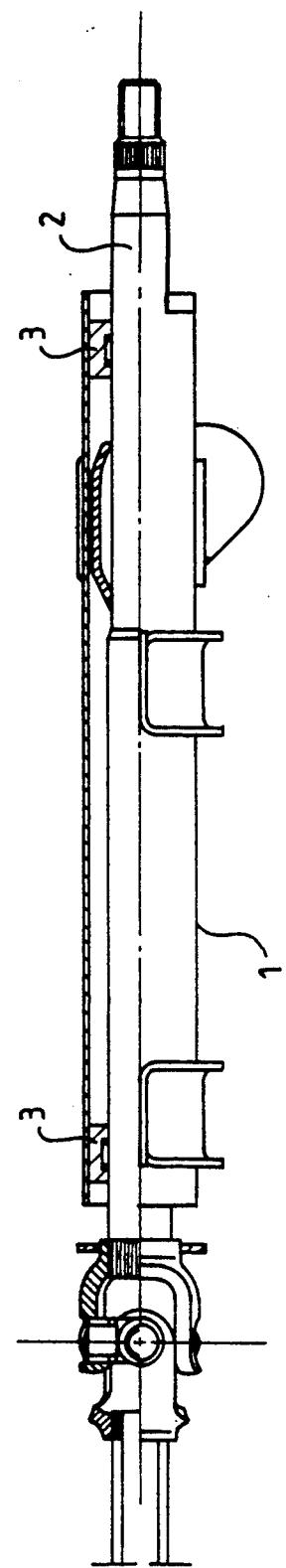
FIG. 1
FIG. 2

STEERING-COLUMN BODY TUBE FOR A MOTOR VEHICLE

FIELD OF THE INVENTION

The present invention relates to a steering-column body tube for a motor vehicle and especially for a private motor vehicle.

The invention concerns more precisely a steering column device composed of an assembled column body in which a body tube supports, with two bearings, the steering-wheel shaft. In this kind of steering column device, the invention relates to the design and construction of the body tube.

DESCRIPTION OF THE PRIOR ART

In known steering column devices, such as the one which is shown in FIGS. 1 and 2, the body tube 1 is generally composed of a tube to which the elements necessary for the mounting and for the fixing of this body tube are attached. Most often, these various elements are welded directly onto a tube, or, in other cases, they are connected to the tube by fixing means. When these various elements are connected by welding, it is necessary for these elements to be positioned precisely in relation to the tube. As a result, a weld-mounting tool is essential. Despite this, it is not possible to prevent these various elements from being positioned imprecisely, because of the tolerance deviations of the various components because of assembly and of the deformations caused by the welding. In addition, welding leads to residual stresses in the body tube after its production. In the case of assembling the various elements with the central tube with fixing means, it is necessary to provide complex and relatively bulky and heavy mountings. In all these types of production, a large number of elementary parts are used preparation and assembly of which must occur in sequence. Production costs are increased and relatively large dimensional deviations and residual stresses are exhibited.

GENERAL DESCRIPTION OF THE INVENTION

The object of the invention is to avoid the abovementioned drawbacks and to provide a steering-column body tube for a motor vehicle, which is composed of a minimum of elements and further to provide such a steering column body tube, in such a manner as to ensure dimensional precision while having the lowest possible manufacturing cost price.

According to one embodiment of the invention, the steering-column body tube for a motor vehicle comprises a steering-wheel shaft mounted in the body tube by two bearings disposed substantially at each of the ends of the body tube. The body tube is produced from a single metal sheet in which two front fixing lugs, two rear fixing lugs and a tube are formed from a blank cut-out of this metal sheet. The blank cut-out comprises a cut-out for the two front lugs with their front central element, a cut-out for the two rear lugs with their rear central element, a cut-out for a front element situated between the front lugs and the rear lugs and a cut-out for a rear element. The cut-out for the front central element, the cut-out for the rear central element and the cut-out for the rear element are rolled over so as to bring the two edges of the front element and the two edges of the rear element respectively back substantially one against the other in order to be integrally connected in such a manner as to produce the tube. This tube also possesses a front opening between the two front fixing lugs and a rear opening between the two rear fixing lugs, the width of these openings being substantially equal to the width of the corresponding lugs. The lugs, together with the tube, form a single piece.

Advantageously, the two edges of the front element and the two edges of the rear element are respectively integrally connected one in relation to the other either by welding by crimping or by a fastened edge system. In the latter case, and according to a preferred variant of the invention, the fastening of the edges is performed with tabs which are arranged on both sides of the front element and on both sides of the rear element. These tabs are separated from each other by housings, which have a corresponding shape with dimensions slightly greater than those of these tabs, in such a manner that each tab of one edge can be fastened into the corresponding housing of the other edge. This fastening is carried out by overlapping the two corresponding edges and penetration in the radial direction. More precisely, the housings have a substantially trapezoidal-shaped contour with linking fillets between the bottom, the sides and the corresponding edge.

According to an advantageous configuration of the invention, a linkage arm joins the front element with the rear element by connecting the portion of the front element with the portion of the rear element, which portions are located on each side of the rear opening. The linkage arm comprises an elongate element which is mounted outside the tube.

In another aspect of the invention, the linkage arm comprises an elongate element which is mounted inside the tube.

In another aspect of the invention, the linkage arm is welded onto the tube.

In another aspect of the invention, the linkage arm is integrated with an anti-theft strengthening element.

In another aspect of the invention, the linkage arm is integrated with an anti-theft module.

In another aspect of the invention, the linkage arm is integrated with a strengthening square element.

In another aspect of the invention, each of the fixing lugs comprises a stiffener which is obtained by direct deformation in the metal sheet.

The steering-column body tube according to the invention thus exhibits the advantage of being a part made as one piece which integrates the fixing lugs with the body. In addition, it makes it possible to start from a single metal sheet, which avoids additional production operations and eliminates all the elementary parts necessary in conventional productions. This type of design according to the invention is particularly advantageous in mass production, as it limits the number of stations for carrying out the various steps of manufacturing the body tube, thereby reducing the need for handling between manufacturing steps and the need for multiple parts which increase the final production cost. In addition, there is no longer any weld in the vicinity of the fixing lugs, which avoids any dimensional error and eliminates the residual stresses due to these welds.

BRIEF DESCRIPTION OF THE DRAWINGS

Other advantages will emerge from the invention, which will be better understood with the aid of the description given hereinbelow of particular exemplary embodiments described in a non-limiting way with reference to the attached drawings in which:

FIG. 1 is a plan view of a steering column device for a motor vehicle;

FIG. 2 is a longitudinal view corresponding to FIG. 1 with an axial semi-section;

DESCRIPTION OF THE PREFERRED EMBODIMENTS

Figure 3:
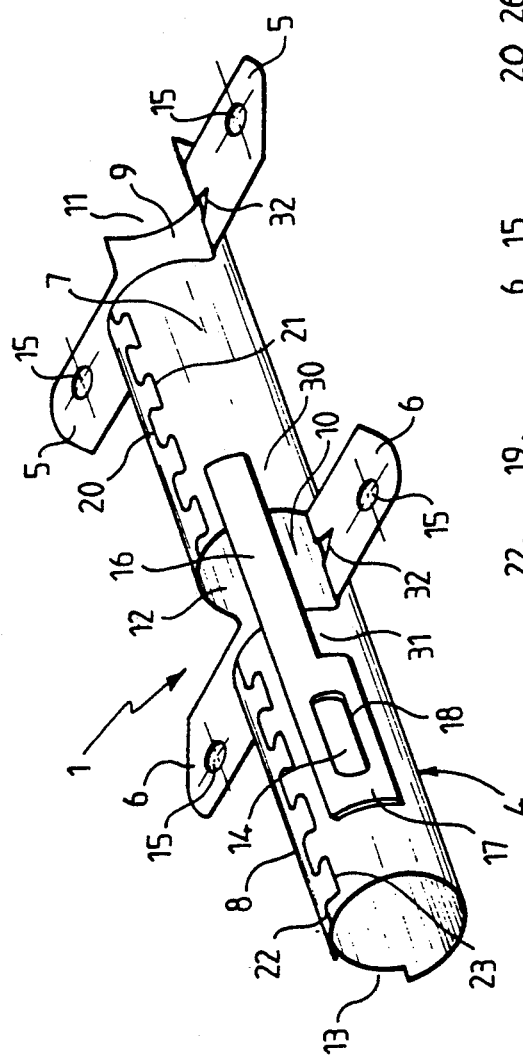
FIG. 3 is a perspective of the body tube according to the invention.

The invention relates to a steering column for a motor vehicle, such as that shown in FIGS. 1 and 2 and which comprises a steering-wheel shaft 2 mounted in a body tube 1 by two bearings 3 which are disposed substantially at each of the ends of this body tube 1.

The body tube 1 comprises a tube 4 which is provided with two front fixing lugs 5 and with two rear fixing lugs 6, the front fixing lugs being directed towards the front of the motor vehicle while the rear fixing lugs are closest to the steering wheel. The tube 4 comprises a front element 7 and a rear element 8, the front element 7 being disposed between the front fixing lugs 5 and the rear fixing lugs 6, which are themselves placed between the rear element 8 and the front element 7. The two front fixing lugs 5 are disposed on either side of the tube 4 and they are connected via a front central element 9. In the same way, the two rear fixing lugs 6 are disposed on each side of the tube 4 and they are connected via a rear central element 10. Finally, the tube 4 possesses a front opening 11 disposed at the position of the two front fixing lugs 5 and defined by an edge of the front central element 9. The tube 4 also possesses a rear opening 12 which is disposed at the position of the two rear fixing lugs 6 and which is defined by an edge of the rear central element 10.

So as to reinforce the junction of both front lugs 5 with the front central element 9, stiffeners 32 are disposed at the junction of both of these fixing lugs 5 with this front central element 9. In the same manner, stiffeners 32 are provided at the junction of both rear fixing lugs 6 with the rear central element 10. The two edges 20 and 21 of the front element 7 are respectively integrally connected, one in relation to the other, by means of a fastened edge system. In the same manner, the two edges 22 and 23 of the rear element 8 are connected, one in relation to the other, also by the fastened edge system.

A linkage arm 16 is provided in such a manner as to join the front element 7 with the rear element 8 of the tube 4 so as to strengthen its mechanical resistance. In order to do this, this linkage arm 16 connects a part 30 of the front element 7 with a part 31 of the rear element 8, these two parts 30 and 31 being located on either side of the rear opening 12. This linkage arm 16 is integrated with an anti-theft strengthening element 17 which is disposed on the front element 8 in such a manner that the slot 18 of this anti-theft strengthening element 17 coincides with an anti-theft opening 14 which is provided in this rear element 8. The assembly of the linkage arm 16 with the anti-theft strengthening element 17 is welded onto the outside of the tube 4, on the one hand, onto the rear element 8 and, on the other hand, onto the front element 7. Finally, the end of the rear element 8 comprises a recess 13 which serves to orient the support of combination switches.

The linkage arm 16 which is constituted by an elongate element and which is welded on the outside of the tube 4 in the embodiment shown in FIG. 3, may also, according to an embodiment of the invention, be mounted on the inside of this tube. 4. It may also, in this case, be welded onto the tube 4 and be integrated with an anti-theft strengthening element.

According to another embodiment of the invention (not shown), the linkage arm 16 is integrated with the anti-theft module. Finally, according to another embodiment of the invention, the linkage arm is integrated with a strengthening square element which is provided at the lower part of the tube 4.

Figure 4:
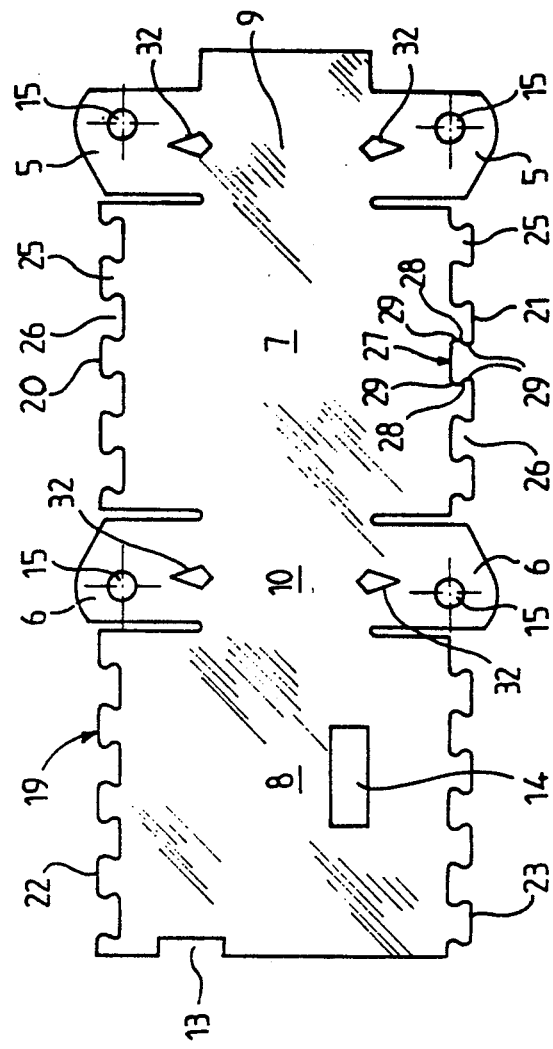
FIG. 4 is a view of a blank cut-out of the metal sheet used in producing the body tube shown in FIG. 3.

As may be seen in FIGS. 3 and 4, the body tube 1 according to the invention is produced from a single metal sheet in which are provided the two front fixing lugs 5, the two rear fixing lugs 6 and the tube 4 from a blank cut-out 19 of this metal sheet. This blank cut-out 19 comprises a cut-out for the two front lugs 5 with their front central element 9, a cut-out for the two rear lugs 6 with their rear central element 10, a cut-out for the front element 7 located between the front lugs 5 and the rear lugs 6 and a cut-out for the rear element 8. The fixing hole 15, which is provided on each of the fixing lugs 5 and 6, is produced in this cut-out together with the anti-theft opening 14 which is disposed in the front element 8. In addition, the stiffeners 32 are obtained by means of deformed elements which are produced at the junction of each of the front fixing lugs 5 with the front central element 9 and at the junction of each of the rear fixing lugs 6 with the rear central element 10. Finally, this blank cut-out 19 comprises, at the end of the rear element 8, the recess 13 intended for orienting the support of the combination switches.

Both edges 20 and 21 of the front element 7 and of the two edges 22 and 23 of the rear element 8 comprise tabs 25 which are separated from each other by housings 26. These housings 26 have a shape corresponding to the tabs 25 with dimensions slightly greater than the latter, in such a manner that each tab 25 of an edge 20 or an edge 22 can be fastened into the corresponding housing 26 of the other edge 21 or 23. So as to permit this fastening by the entering of the tabs 25 into the corresponding housings 26, each of these housings 26 has a substantially trapezoidal-shaped contour with linking fillets 29 which are disposed between the bottom 27 and the two sides 28 and between these two sides 28 and the corresponding edge 20, 21, 22 or 23.

In order to obtain the tube 4, the cut-out for the front central element 9, the cut-out for the front element 7, the cut-out for the rear central element 10 and the cut-out for the rear element 8 are rolled over so as to respectively bring back the two edges 20 and 21 of the front element 7 and the two edges 22 and 23 of the rear element 8 substantially one against the other in order to be integrally connected. In order to do this, the fastening is carried out by overlapping the two edges 20 and 21, and the two edges 22 and 23, and then by penetration in the radial direction of each of the tabs 25 into the corresponding housing 26. The desired tube 4 is thus obtained which possesses the front opening 11 for the two front fixing lugs 5 and the rear opening 12 for the two rear fixing lugs 6. The width of each of these openings 11 and 12 is substantially equal to the width of the corresponding fixing lugs 5 and 6. The tube 4 thus forms, together with the front fixing lugs 5 and the rear fixing lugs 6, a part made from one piece to from the body tube 1.

In an embodiment (not shown), the two edges 20 and 21 of the front element 7 and the two edges 22 and 23 of the rear element 8 are respectively integrally connected, one in relation to the other, by welding.

In another embodiment (not shown), the two edges 20 and 21 of the front element 7 and the two edges 22 and 23 of the rear element 8 are respectively integrally connected, one in relation to the other, by crimping.

In another embodiment of the invention (not shown), the steering-wheel body tube 1 for a motor vehicle comprises only two rear fixing lugs 6 with the tube 4. In this configuration, the rear fixing lugs are disposed between the front element 7 and the rear element 8 of the tube 4. The body tube 1 is then obtained in a similar manner to that described previously, that is to say it is produced from a single metal sheet, in which there are arranged the two rear fixing lugs 6 and the tube 4, from one blank cut-out 19 of this metal sheet. This blank cut-out 19 comprises a cut-out for the rear lugs 6 with their rear central element 10, which cut-out is disposed between a cut-out for the front element 7 and a cut-out for the rear element 8. The cut-out for the front element 7, the cut-out for the rear central element 10 and the cut-out for the rear element 8 are rolled over so as to respectively bring back the two edges 20 and 21 of the front element 7 and the two edges 22 and 23 of the rear element 8 substantially one against the other in order to be integrally connected in such a manner as to produce this tube 4. This integral connection may be achieved, as described above, by folded-seam locking, by welding, or by crimping. In this embodiment of the invention, the tube 4 possesses a rear opening 12 for the two rear fixing lugs 6, the width of which is substantially equal to the width of these rear fixing lugs 6. The tube 4 thus forms, together with the two rear fixing lugs 6, a single part made as one piece which constitutes the body tube 1. It is also possible, as in the embodiment shown in the figures, to provide a linkage arm 16 which joins the front element 7 with the rear element 8. In the same manner, this linkage arm 16 may be mounted on the outside or on the inside of the tube 4 onto which it is welded.

According to different variants of the invention, the linkage arm 16 may also, as in the preceding embodiments, be integrated with the anti-theft strengthening device 17, be integrated with an anti-theft module, or be integrated with the reinforcing square provided at the lower part of the tube 4, and it can also be integrated with a combination-switch support lug or with a shell support lug below the steering wheel.

The body tube 1 according to the invention with its linkage arm 16 enables an assembly to be obtained which is particularly rigid in bending, with a correct proper frequency which enables the forces to be transferred between the front element 7 and the rear element 8. In addition, this design of the body tube 1 according to the invention enables an assembly to be made which meets the conditions of standards relating to anti-theft torque and to static deflection due to the driver.

While the present invention has been described with respect to its various and preferred embodiments, it is not intended to limit such invention by the description given. Various alternative embodiments not specifically described will be readily apparent to those skilled in the art, and it is intended that they be embraced within the scope of the invention, insofar as the appended claims may permit.

What is claimed is:

1. A steering-column body tube for a motor vehicle, comprising:

a steering-wheel shaft;
a body tube having two rear fixing lugs; and
two bearings disposed substantially at each end of the body tube for mounting the steering wheel shaft in the body tube,
the body tube being formed from a blank cut-out of a metal sheet, the blank cut-out including a cut-out for the two rear fixing lugs with a rear central element, the cut-out for the rear fixing lugs being disposed between a cut-out for a front element having two opposite edges and a cut-out for a rear element having two opposite edges, and the cut-out for the front element, the cut-out for the rear central element, and the cut-out for the rear element being rolled over so as to bring the two opposite edges of the front element and the two opposite edges of the rear element substantially one against the other in order to be connected to form the tube so that it has a rear opening for the two rear fixing lugs.

2. The body tube as claimed in claim 1, wherein the body tube is formed from a single metal sheet so as to further form two front fixing lugs along with the two rear fixing lugs and the tube from the blank cut-out of the metal sheet, the blank cut-out including a cut-out for the two front fixing lugs with a front central element, the cut-out for the two rear fixing lugs with their rear central element, the cut-out for the front element being disposed between the front fixing lugs and the rear fixing lugs, the cut-out for the front central element, the cut-out for the front element, the cut-out for the rear central element, and the cut-out for the rear element being rolled over so as to bring the two edges of the front element and the two edges of the rear element substantially one against the other in order to be connected to form the tube so that it has a front opening for the two front fixing lugs and a rear opening for the two rear fixing lugs.

3. A steering-column body tube for a motor vehicle, comprising:

a steering-wheel shaft;
a body tube having two rear fixing lugs; and
two bearings disposed substantially at each end of the body tube for mounting the steering wheel shaft in the body tube,
the body tube being formed from a blank cut-out of a metal sheet, the blank cut-out including a cut-out for the two rear fixing lugs with a rear central element, the cut-out for the rear fixing lugs being disposed between a cut-out for a front element having two opposite edges and a cut-out for a rear element having two opposite edges, and the cut-out for the front element, the cut-out for the rear central element, and the cut-out for the rear element being rolled over so as to bring the two opposite edges of the front element and the two opposite edges of the rear element substantially one against the other in order to be connected to form the tube so that it has a rear opening for the two rear fixing lugs, the width of the rear opening being substantially equal to the width of the rear fixing lugs; and
a linkage arm, the linkage arm joining the front element with the rear element by connecting a portion of the front element with a portion of the rear element, the portions being located on either side of the rear opening.

4. The body tube as claimed in claim 1, wherein the opposite edges of the front element and the opposite edges of the rear element are connected by welding.

5. The body tube as claimed in claim 1, wherein the opposite edges of the front element and the opposite edges of the rear element are connected by crimping.

6. The body tube as claimed in claim 1, wherein the opposite edges of the front element and the opposite edges of the rear element are connected by fastening the opposite edges of the front element and fastening the opposite edges of the rear element.

7. The body tube as claimed in claim 6, wherein tabs are provided on the opposite edges of the front element and the opposite edges of the rear element, the tabs on each edge being separated from each other by housings which have a shape corresponding to, and with dimensions slightly greater than those of the tabs such that each tab is adapted to be fastened into a corresponding housing on an opposite edge by overlapping the opposite edges of the front and rear elements and causing penetration of the tabs into the corresponding housings in the radial direction, thereby fastening the opposite edges of the front and rear elements.

8. The body tube as claimed in claim 7, wherein the housings have a substantially trapezoidal-shaped contour with linking fillets between the bottom, the sides and the edges of the front and rear elements.

9. The body tube as claimed in claim 3, wherein the linkage arm comprises an elongate element.

10. The body tube as claimed in claim 9, wherein the linkage arm is mounted on the outside of the tube.

11. The body tube as claimed in claim 9, wherein the linkage arm is mounted on the inside of the tube.

12. The body tube as claimed in claim 3, wherein the linkage arm is welded onto the tube.

13. The body tube as claimed in claim 3, wherein the linkage arm includes an anti-theft strengthening element.

14. The body tube as claimed in claim 3, wherein the linkage arm includes an anti-theft module.

15. The body tube as claimed in claim 3, wherein the linkage arm includes a strengthening square element.

16. The body tube as claimed in claim 3, wherein the linkage arm includes a combination-switch support lug.

17. The body tube as claimed in claim 3, wherein the linkage arm includes a shell support lug below the steering wheel.

18. A steering-column body tube for a motor vehicle, comprising:
- a tube having an integral front element and rear element;
- a pair of rear fixing lugs extending outwardly on opposite sides of the tube from between the front and rear elements, the rear fixing lugs being substantially flat;
- a pair of front fixing lugs extending outwardly on opposite sides of the tube from adjacent the front element, the front fixing lugs being substantially flat,
- the tube having a seam extending longitudinally of the tube, the seam being formed by a plurality of tabs and a plurality of housings for receiving the tabs;
- the tube and the front and rear fixing lugs being formed from a flat blank.

19. A steering-column body tube for a motor vehicle, comprising:
- a tube having an integral front element and rear element;
- a pair of rear fixing lugs extending outwardly on opposite sides of the tube from between the front and rear elements, the rear fixing lugs being substantially flat;
- a pair of front fixing lugs extending outwardly on opposite sides of the tube from adjacent the front element, the front fixing lugs being substantially flat,
- the tube having a seam extending longitudinally of the tube, the seam having a plurality of tabs and a plurality of housings for receiving the tabs; and
- a linker arm secured to the front and rear elements.

20. A blank for forming a steering-column body tube for a motor vehicle, the blank comprising:
- a metal sheet having opposite longitudinal edges and front and rear edges, the sheet having a front element and a rear element and a rear central element between the front and rear elements, and having a front central element between the front element and the front edge,
- the rear central element having a pair of rear fixing lugs extending outwardly,
- the longitudinal edges of the sheet having seam locking means for fastening the opposite longitudinal edges together when the blank is rolled to form the body tube.

* * * * *